Oct. 11, 1960 W. S. ROHLAND ET AL 2,956,264
TIME INTERVAL DETECTION SYSTEM
Filed June 29, 1959 4 Sheets-Sheet 1

INVENTORS
WILLIAM S. ROHLAND
LOUIS E. BUNDY, JR.
BY Paul M. Brenner
AGENT

Oct. 11, 1960 W. S. ROHLAND ET AL 2,956,264

TIME INTERVAL DETECTION SYSTEM

Filed June 29, 1959 4 Sheets-Sheet 3

United States Patent Office 2,956,264 Patented Oct. 11, 1960

2,956,264

TIME INTERVAL DETECTION SYSTEM

William S. Rohland, Endicott, and Louis E. Bundy, Jr., Vestal, N.Y., assignors to International Business Machines Corporation, New York, N.Y., a corporation of New York Filed June 29, 1959, Ser. No. 823,530

10 Claims. (Cl. 340—149)

The present invention relates to time interval detection systems, and particularly to an improved time interval detection system for determining, in repeated cycles of events, the sequence and time separation of similar events occurring during successive cycles.

Although not restricted thereto, this invention has particular utility in character recognition systems of the type in which the degree and sense of the slope of the upper edge of characters to be recognized is utilized as at least one criteria of the identification of the character.

As an example of the use to which the present invention may be put, consider a character recognition system in which each of the characters to be recognized is scanned by a plurality of successive vertical scans, each separated horizontally from the next previous scan, so that, in effect, the character is sliced vertically into a plurality of adjacent zones. One set of information which may be useful in determining the character is the slope of the upper contour of the character. To obtain this information, it is necessary to determine, with reference to a suitable datum, such as the starting point of each scan, the relative times of occurrence of intercept with the upper edge of the character for at least two scans. Depending upon the relative time of occurrence with respect to the reference, both the direction and amount of slope of the upper contour can be determined.

Accordingly, a principal object of this invention is to provide an improved time interval detection system.

Since time as a quantity cannot be stored, the present invention contemplates the derivation of voltages proportional to time of occurrence of a particular event during a cycle, storing such voltages developed for each cycle for a plurality of cycles, and thereafter comparing such voltages to determine relative times of occurrence of the events.

Another object of the invention, therefore is to derive a voltage analog of the time of occurrence of a particular event in a given cycle, to store the analog voltage, and subsequently compare the successive values of voltage to determine the relations of the events in a succession of cycles.

A further object of the invention is to provide an improved time interval detection system in which the stored analog value of a previous time interval is compared with other values of time intervals to provide an output signal indicative of the relative time sequence of the intervals.

Still another object of the invention is to provide an improved time interval detection system for detecting the relative times of occurrence of a succession of distinctive events.

Yet another object of the invention is to provide an improved time interval detection system which is capable of quantitatively distinguishing between the relative time of occurrence of a succession of distinctive events.

A further object of the invention is to provide an improved time interval detection system which may be employed to determine the sense and magnitude of slope of the contour of a character, in a character recognition system.

Briefly described, the present invention contemplates the generation of a time interval signal for each of a sequence of events which may occur at different times with respect to a reference time, the amplitude of the time interval signal being constant in each case, but differing in duration in accordance with the expired time between the reference time and the occurrence of the timed event. These interval signals are gated during the cycle in which they occur, to a selected one of a plurality of sawtooth voltage generators and storage devices such as capacitors, so that the time interval for each event is transformed into a voltage analog and stored. The stored voltages are subsequently read out in succession, in the same order as that in which they are stored, to a time regeneration circuit, which regenerates constant amplitude pulses which occur at a time, with respect to a reference time, proportional to the amplitude of the stored time-analog voltage. These regenerated interval signals are then compared with the time of occurrence of a similar event occurring in the present cycle to determine whether the present event occurred earlier or later than the similar event in a previous cycle. This comparison determines the relative sense of the time difference. The difference in time is represented by a difference signal, the duration of which is proportional to the time difference. This difference signal is converted to a time-voltage analog by another sawtooth generator, the output of which is fed to one or more voltage discriminators, from which different outputs are obtained dependent upon the time or duration of the difference signal. The signals from the comparison apparatus and the voltage discriminators may then be combined to provide various output signals indicative of the sense and degree of the time difference of the recurrent events.

The foregoing and other objects, features and advantages of the invention will be apparent from the following more particular description of a preferred embodiment of the invention, as illustrated in the accompanying drawings.

Figure 3A:
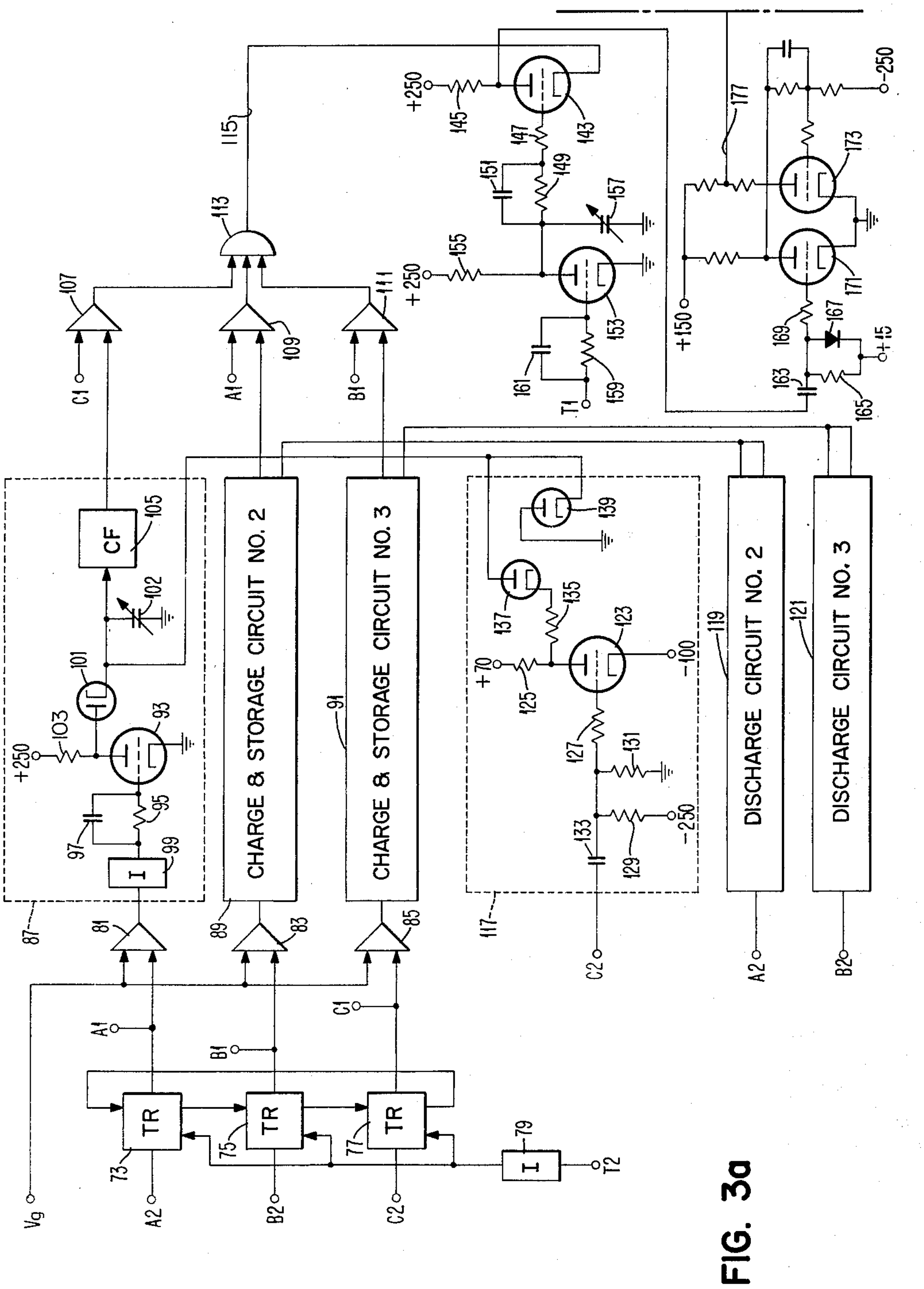
Figure 3B:
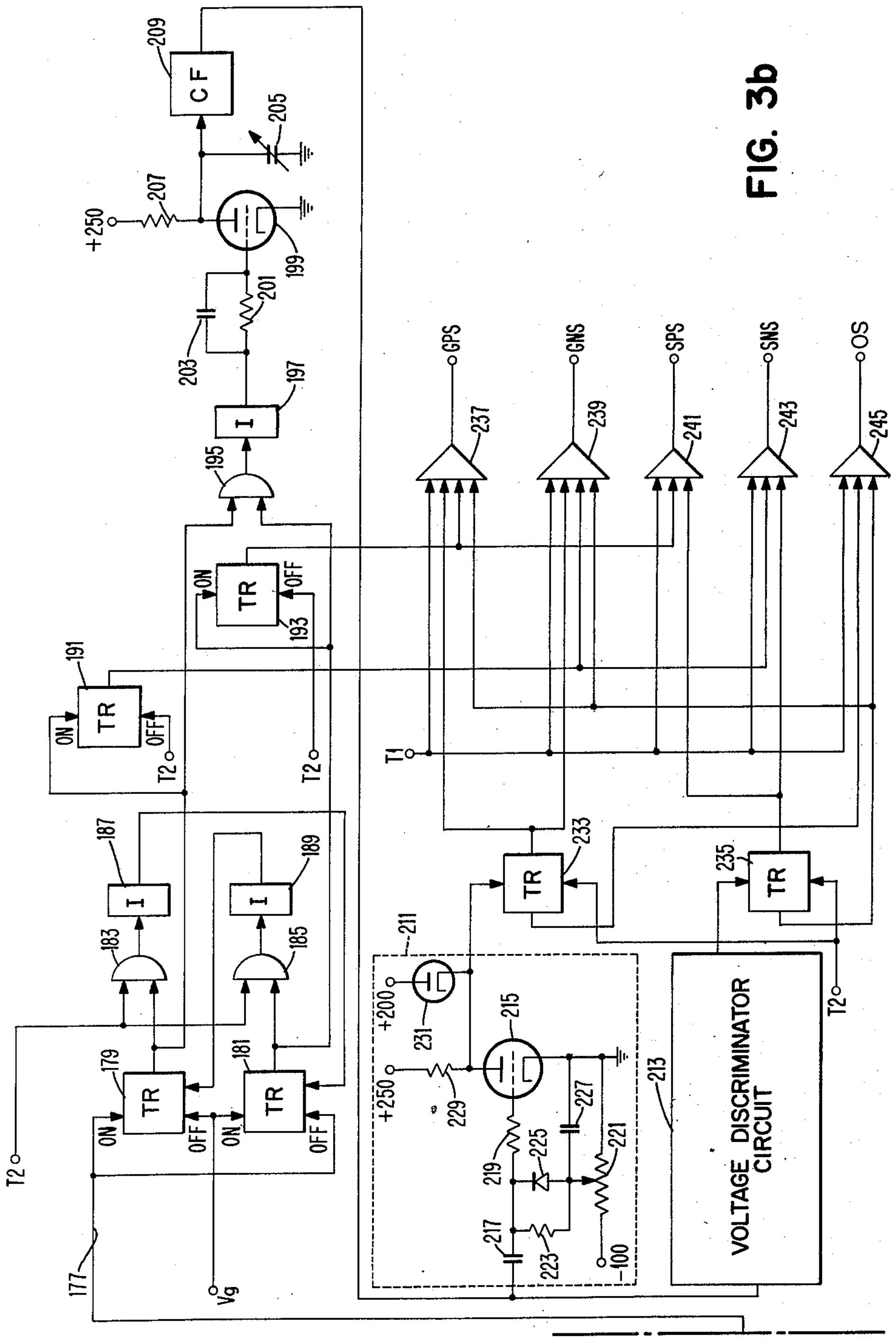

Figs. 3*a* and 3*b*, placed end to end with Fig. 3*a* to the left, illustrate the details of the circuits employed in a preferred embodiment of the invention.

Figure 4:
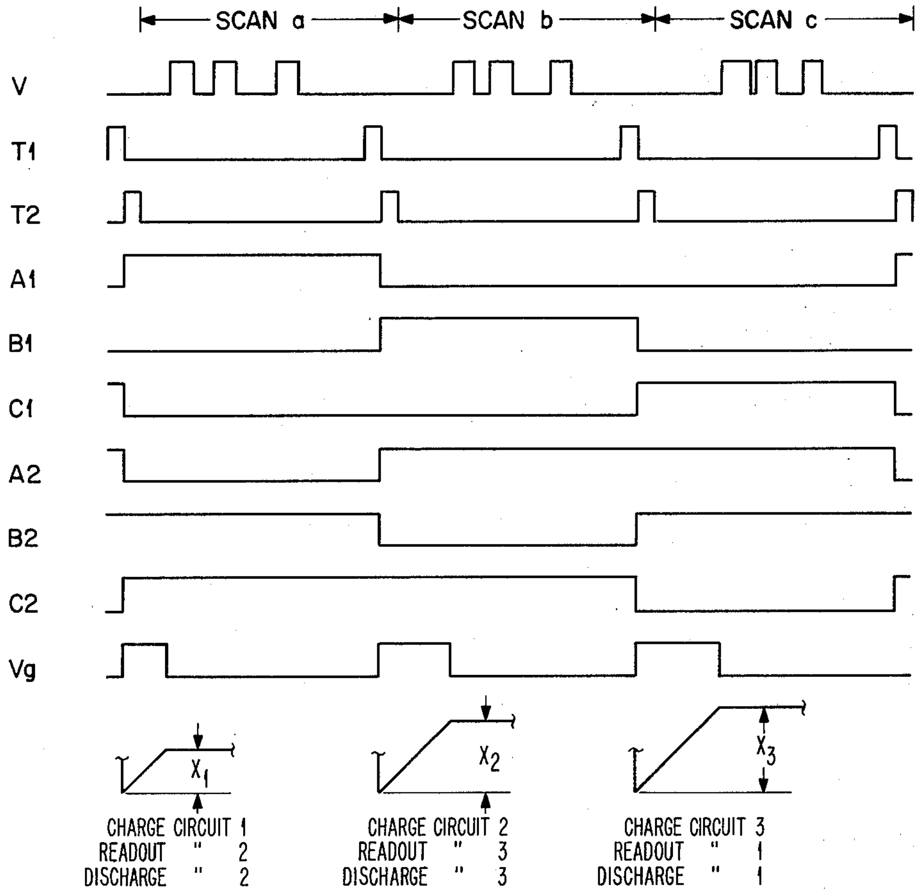
Figure 5:
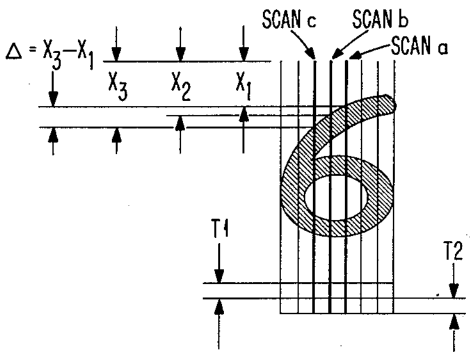

Fig. 4 is a diagrammatic representation of waveforms which appear at various points in the system; and Fig. 5 is a diagrammatic representation of the manner in which a character is scanned to determine the slope characteristics of its upper contour.

Figure 1:
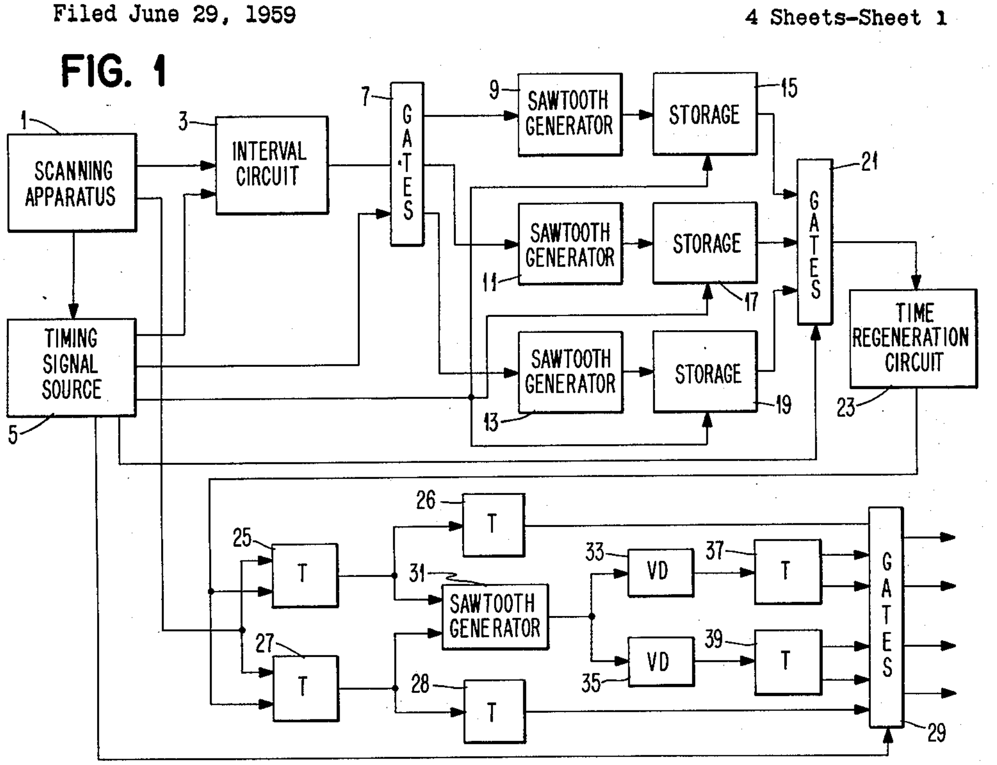
Fig. 1 is a schematic block diagram of a preferred embodiment of the invention as applied in a character recognition system.

Referring to Fig. 1, the reference character 1 designates a scanning apparatus for scanning characters to be recognized by a plurality of successive or serial scans through each character. Although additional recognition criteria may be used, it is assumed that it is desired to know the direction and degree of slope of the upper contour of the scanned character. The scanning or video signals, produced during each scan by interception of a portion of the character, are supplied to an interval circuit 3, along with a timing signal supplied from a source of timing signals 5. The output of interval circuit 3 is a pulse which starts at a definite time with reference to the beginning of each serial scan and ends with the time of the first interception of the upper contour of the character being scanned. Gating signals, derived from the timing circuits, switch the time interval signals occurring on successive scans, by means of a plurality of gates illustrated generally at 7, to respective ones of a plurality of sawtooth voltage generators 9, 11 and 13, each of which supplies an output to an associated capacitor storage circuit 15, 17 and 19. Thus the time measurements are converted to analog voltage values, each separately stored for a sequence of scans, in the present instance three, but which can obviously be more or less.

The stored voltages are read out sequentially from the respective storage circuits by associated read-out gates 21, also controlled by sequential timing signals as are the read-in gates 7. Following read-out, each of the storage devices is reset to an initial or normal condition by sequential reset signals supplied from the timing signal source 5.

The signals read out from the storage circuits are supplied to a time regeneration circuit 23, in which the magnitude of the voltage supplied thereto determines the time of occurrence of an output pulse, with respect to a specified reference time.

The regenerated time interval signal is supplied to the inputs of a pair of triggers 25 and 27, along with the interval signal for the present scan. One of the triggers, such as trigger 25, is turned on by the regenerated time interval signal and turned off by the trailing edge of the present scan interval signal, while the other trigger, such as trigger 27, is turned on by the trailing edge of the present scan interval signal and turned off by the regenerated time interval signal. Thus the setting of the triggers determines the sense of the slope. In the first case, if the first trigger 25 is turned on, a negative slope is indicated, i.e., the time interval on a previous scan was less than that on the present scan. In the second case, if the signal from the present scan turns the second trigger on before the regenerated time interval signal from a previous scan turns the trigger off, a positive slope is indicated, i.e., the time interval on the previous scan was less than that on the present scan.

The outputs from triggers 25 and 27 therefore indicate the sense of the time difference, negative and positive respectively. The outputs from these triggers are supplied to a pair of storage triggers 26 and 28, the outputs of which are connected to a plurality of output gates 29, along with other signals to be presently described.

The outputs from triggers 25 and 27 are also supplied to a sawtooth generator 31, these signals representing the difference in time of occurrence of the present and previous signals. The sawtooth generator provides a linearly increasing output voltage proportional to the time duration of the difference in time of the present and previous time interval signals.

The output of sawtooth generator 31 is supplied to the inputs of two voltage discriminator circuits 33 and 35, which are arranged to provide outputs therefrom when and only when the voltages supplied thereto exceed predetermined limits. Thus, the amount of difference between the present and previous time intervals can be determined. The outputs of the voltage discriminators are supplied to a pair of triggers 37 and 39, which serve as temporary storage devices, the outputs of which can be combined with the sense signals in the output gates 29.

It can be seen, therefore, that not only can the sense of the slope of the upper character contour be determined, but also the amount or degree of slope can be determined.

Figure 2:
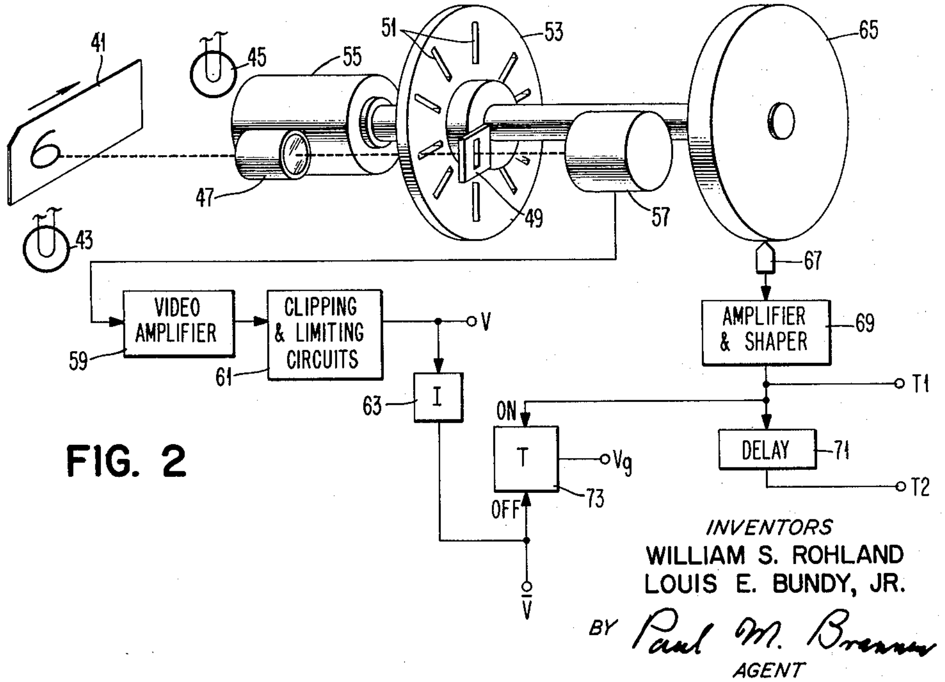
Fig. 2 is a diagrammatic illustration of one form of character scanning apparatus and timing circuits which may be employed.

Now considering the specific arrangements which may be employed in the invention, reference is first made to Fig. 2.

There is shown an optical scanning arrangement of the well-known rotating disc type in which the characters on a document 41 are moved at a constant speed past a scanning location, by means not shown, in the direction indicated by the arrow. The document is brightly illuminated by a suitable light source, such as the lamps 43 and 45. The image of the laterally-moving character is focused by a suitable lens assembly 47 and broken into a plurality of successive vertical scans by the cooperation of a vertical stationary slit 49 and the radial slits 51 in disc 53, the disc being rotated in the direction indicated by the arrow, at a substantially constant speed by driving means such as the direct-connected motor 55. A suitable photo-responsive device 57 such as a photomultiplier tube is arranged to receive bits of light from the dissected image and provide suitable amplified scanning information through a conventional video amplifier 59 to a clipping and limiting circuit 61, wherefrom constant amplitude video signals are supplied to a terminal V, and the inverted or negative video signals are supplied to terminal $\bar{V}$ through an inverter 63. The circuits designated by these block symbols, as well as others to be later referred to, are well known and conventional, and hence are not described in detail.

Mounted on the same shaft as the scanner disc 53 is a magnetic disc or drum 65, having permanently recorded synchronizing signals recorded on the periphery thereof, which are transduced via pick up head 67 and the associated amplifier and shaper circuits 69 to provide a series of timing or synchronizing pulses which have an exact time relationship to the vertical scans of the character. These timing signals, which in the present case are considered to occur shortly before the end of each scan, are designated by the reference character T1, applied to the terminal thus designated in the various drawings. A second timing pulse is obtained by delaying the T1 pulses by a suitable time interval, by any suitable delay device 71, the output of which is designated by T2, as applied to the terminals in the various drawings.

The time interval circuit 3, described in connection with Fig. 1, is illustrated in detail in Fig. 2 as comprising a conventional trigger 73 arranged to be turned on by the trailing edge of the T1 signal, and to be turned off by the trailing edge of the negative or $\bar{V}$ signal. That is, trigger 73, as is conventional with many triggers, is switched from one stable state to the other by a negative-going pulse supplied to the appropriate input terminal. Accordingly, the occurrence of timing pulse T1, shortly before the beginning of a scan, will switch trigger 73 on, at the termination of signal T1. As long as no portion of the character is seen, the signal V will be down, hence $\bar{V}$ will be up. Upon the occurrence of the first interception of the upper portion of a scanned character, a positive V signal will occur, hence terminal $\bar{V}$ will drop in potential and this negative-going signal will turn trigger 73 off. The output of trigger 73 when on, is designated by the reference character V*g*, at the various terminals in the drawings, and it can be seen that the duration of signal V*g* is determined by the time interval existing between a predetermined time referred to the start of a scan, and the time at which a portion of the character is intercepted during that scan. The signal V*g* is thus the equivalent of the signal supplied from the output of the interval circuit 3 in Fig. 1.

The time relationship of these signals and the scanning operation may be seen by reference to Figs. 4 and 5. In Fig. 5, the time scale for each scan is vertical, the successive scans through the figure "6" being indicated by the spaced vertical lines. It can be seen that signals T1 and T2 occur in succession at the end of each scan, which proceed from top to bottom in order from right to left. Thus, just before the start of each scan, a T1 and T2 pulse occur in succession, the termination of the T2 pulse being coincident with the start of the next scan. This time relationship is clearly shown in Fig. 4. The V signals shown in Fig. 4 correspond to the signals produced when, during scans *a*, *b* and *c* shown in Fig. 5, interception of the character occurs, the timing of the V signals being referred to the start, or upper end of the associated scan. The Vg signals, as seen in Fig. 4, start at the termination of each T1 pulse and end at the first V signal occurring thereafter. It can clearly be seen that the duration of the Vg signals is directly proportional to the time interval existing between the start of a particular scan and the occurrence of the first interception of the scanned character.

It is also seen that the T2 pulses are of equal duration to the T1 pulses and immediately follow the T1 pulses.

Referring now to Fig. 3a, it was previously pointed out the time interval, or Vg pulses, are supplied in sequence to the sawtooth generators and storage circuits for storing the time intervals in terms of voltages, for successive scans. To obtain such operation a closed ring or chain of triggers is provided.

Triggers 73, 75 and 77 are connected to form a closed ring, the stages being successively turned on and off under the control of inverted T2 pulses, $\overline{T2}$, obtained via an inverter 79 from the T2 pulses. As the triggers are operated in succession, a sequence of output pulses are supplied therefrom, in the order A1, B1, C1, at the terminals designated by these reference characters, each of these signals extending in time from the beginning of one T2 pulse until the beginning of the next T2 pulse, as seen in Fig. 4. Similarly, the other outputs of the triggers designated as A2, B2 and C2, at the designated terminals are the inverted form of the A1, B1 and C1 signals, again which may be seen in Fig. 4. The Vg signals are supplied to one input of each of three AND circuits 81, 83 and 85, the other inputs being the A1, B1 and C1 signals respectively. Thus during each of the three successive scans, the Vg signals are directed through the appropriate AND circuit to the inputs of three identical charging and storage circuits, designated generally by the reference characters 87, 89 and 91. Since these circuits are identical, only the first will be described in detail. A triode 93 has its grid connected to a circuit comprising a resistor 95 and capacitor 97 connected in multiple and through an inverter 99 to the output of AND circuit 81. Triode 93 is normally conducting, but when a positive output is supplied from AND circuit 81, the grid of 93 is driven negative and triode 93 cuts off. A storage capacitor 102 is connected via a diode 101 to the plate of triode 93, which is also connected to a positive potential terminal +250 via a resistor 103. With triode 93 cut off, capacitor 102 will charge at a substantial linear rate from the +250 potential via resistor 103 and diode 101. Termination of the Vg signal will restore the triode 93 to conduction, but because of the polarity of diode 101, capacitor C1 will not discharge. Because the time of charging of capacitor C1 is proportional to the length of the Vg signal, it can be seen that the voltage across capacitor C1 will be proportional in magnitude to the time interval between the start of a scan and the interception of the upper contour of the character. On the next following scan, the output from AND circuit 83 is supplied to a similar charge and storage circuit #2 designated by reference character 89, so that the voltage appearing across the storage capacitor in this circuit is a direct analog of the time interval between the start of the first interception of the upper contour of the character. Similarly, on the following or third scan, the storage capacitor in charge and storage circuit #3 is charged to a value representative of the time interval between the start of the third scan and interception of the upper contour of the character.

By referring to Figs. 4 and 5, the manner in which the voltages vary with the distance to intercept will be readily apparent. For example, as shown in Fig. 5, the value X1 designates the time interval between the start of scan *a* and time of intercept, and X2 designates the interval between the start of scan *b* and time of intercept and X3 designates the time interval between the start of scan *c* and intercept of the upper contour of the characters shown. These times are successively longer intervals, and this may be seen by examination of the Vg signals in Fig. 4. Immediately below the Vg signals in Fig. 4 there is a representation of the manner in which the storage capacitors are charged to different voltage values of the linearly increasing sawtooth value, so that at the time of intercept which marks the end of Vg signal, the voltage across the capacitors will be increased values as shown by X1 and X2 and X3. It can be seen therefore that on the three successive scans, *a*, *b* and *c*, the capacitors associated with the charge and storage circuits 1, 2 and 3 will be charged in succession as indicated by the legend in Fig. 4.

It is then necessary to provide a read out of the storage voltages in order to regenerate a timed impulse which can be utilized for determination of the sense and amount of slope of the character contour. Read out is accomplished by supplying the voltages from the storage capacitors through suitable cathode follower circuits, such as the cathode follower 105 which has its input connected across the capacitor C1 and has its output connected to one input of an AND circuit 107. AND circuits 109 and 111 similarly have one input connected to the charge and storage circuits #2 and #3, respectively, by way of cathode followers similar to 105, so that the inputs to these AND circuits represent the stored time analog voltage on the storage capacitors of each of these three circuits. The other input to the AND circuits 107, 109 and 111 are the C1, A1 and B1 pulses, respectively. It can be seen from an examination of the timing diagram in Fig. 4, considering a sequence from left to right, that the C1 pulse is separated by one interval from the A1 pulse, the A1 pulse is separated from the B1 pulse by one interval and the B1 pulse is separated from the C1 pulse by one interval. Accordingly, with the read in to the charge and storage circuits occurring on three successive intervals, the output gates 107, 109 and 111 will similarly be energized in succession following the charging time. That is, the charge and storage circuit #1 is read out through AND gate 107 by the C1 pulse which occurs during the second scan interval following read in to the charge and storage circuit #1, and so on for charge and storage circuits #2 and #3. Again this relationship is indicated in the legend in Fig. 4, wherein it is seen that read out for circuit #2 occurs during charging of circuit #1, read out for circuit #3 occurs during the charging for circuit #2, and read out for circuit #1 occurs during charging of circuit #3. The read out of the stored voltages is supplied through an OR circuit 113 so that on a read-out line 115, there will appear in succession time analog voltages, representing the time interval signals Vg occurring on successive previous scans.

Discharge circuits #1, #2 and #3, designated generally by the rectangles 117, 119 and 121, respectively, are provided for the charge and storage circuits #1, #2 and #3. Each of these discharge circuits is identical, and therefore, only the detailed structure associated with discharge circuit #1 will be described in detail. The circuit comprises a triode 123 having its cathode connected to a negative potential terminal −100 and having its anode connected to a positive potential terminal +70 via a resistor 125, the grid of the tube being connected through a limiting resistor 127 to a voltage divider network comprising the resistors 129 and 131 connected in series between a negative potential terminal −250 and ground. The voltage divider network is constructed and arranged so that normally the triode 123 is cut off, since the potential at its grid is slightly more negative than the cathode potential, say, for example, −125 volts. The grid circuit is connected via a capacitor 133 to a terminal of one of the timing ring triggers, such as terminal C2 in the case of discharge circuit #1. By reference to Fig. 4, it will be seen that when the voltage at terminal C2 goes positive at the end of the cycle including scan 3, a positive-going differentiated pulse will be supplied through capacitor 123, the magnitude of which is sufficient to render triode 123 conductive. The anode of triode 123 is connected via a resistor 135 and a diode 137 to the ungrounded terminal of capacitor 102 in the charge and storage circuit #1. Hence, when triode 123 is rendered conductive, a discharge circuit will be established for capacitor 102, which circuit includes the diode 137, and the resistor 135. The voltage across capacitor C1 will hence be lowered to a value determined by a clamping diode 139 which has its anode connected to ground and its cathode connected to capacitor 102, so that in no event can the potential across storage capacitor 102 go below ground potential. It can also be seen that at times other than when tube 123 is conducting, the voltage at the cathode of diode 137 is equal to approximately +70 volts so that the capacitor C1 can charge to this value without the discharging circuit affecting the voltage across the capacitor. It will be evident from a study of the timing diagram shown in Fig. 4, that the storage capacitors associated with the charge and storage circuits #1, #2 and #3, will be discharged at the termination of the C2, A2 and B2 signals, respectively. Thus the three storage capacitors will be successively discharged at the end of their respective read-out intervals, preparatory to receiving a subsequent charge from a following scan.

The time analog voltages read out on the line 115 are supplied to the time regeneration circuit shown in Fig. 3*a*, wherein the time analog voltages of varying magnitude are reconverted into timed pulses, occurring after a fixed reference time, at a time proportional to the analog voltage. As shown, the line 115 is connected to the cathode of a triode 143, the anode of which is connected to the positive potential +250 by a resistor 145. The grid of triode 143 is connected via the circuit including resistors 147 and 149, the latter being shunted by a capacitor 151, to the anode of a switch triode 153, this anode also being connected to the positive potential +250 via a resistor 155. A variable capacitor 157 is connected from the anode of triode 153 to ground potential and the cathode of triode 153 is also connected to ground potential. T1 pulses are supplied to the grid of triode 153 via the parallel circuit comprising resistor 159 and capacitor 161.

The parts are proportioned and arranged so that the switch tube 153 is normally cut off, and is rendered conductive by the T1 pulses, to thereby discharge the timing capacitor 157. At the termination of each T1 pulse, tube 153 becomes nonconductive and capacitor 157 charges at a linear rate from the +250 volt source through resistor 155. This linearly increasing voltage is supplied to the grid of tube 143 so that tube 143 will commence to conduct as soon as the linearly increasing grid voltage exceeds the cathode voltage which in turn is the value of the time analog voltage supplied from the output of the storage capacitors. It can be seen, therefore, that tube 143 will commence conduction at a time following the termination of the T1 pulse, which time is proportional to the value of the time analog voltage supplied to the cathode of the tube. The output from tube 143 is supplied via a differentiating circuit comprising capacitor 163 and resistor 165, with a clamping diode 167 connected thereto, and through a limiting resistor 169 to the grid of a triode 171. Since conduction of tube 143 will result in a decrease of the output voltage, the input to triode 171, in view of the differentiating circuit, will consist of a relatively sharp negative-going pulse which is amplified and squared off by the tandem-connected triode inverters 171 and 173. These inverters serve the function of amplifying and squaring off a negative-going pulse, which appears on output line 177.

The regenerated time interval signal on line 177 is supplied to a pair of triggers 179 and 181, Fig. 3*b*, in such a manner that the negative-going signal is supplied to trigger 179 to the input terminal thereof effective to turn the trigger on, and is supplied to trigger 181 to the terminal effective to turn the trigger off. Also, the V*g* signal is supplied to triggers 179 and 181 in such manner as to turn trigger 179 off, and is supplied to trigger 181 to a terminal thereof effective to turn this trigger on. These two triggers may be designated negative and positive slope triggers respectively. If the negative-going regenerated time signal occurring on line 177 occurs prior to the end of the V*g* signal, it can be seen that trigger 179 will be turned on by the regenerated time signal, and turned off by the V*g* signal termination, since these triggers are designed to operate on the negative-going portions of a signal. Such a condition would be obtained when the time interval between the start of the previous scan and the intercept of the upper contour of the character was of shorter duration than the time interval in the present scan between the start of the scan and the intercept of the upper contour of the character, such a condition indicating a negative slope to the upper contour of the character, this condition being illustrated in Fig. 5 in which the slope of the upper contour of the figure "6" is negative insofar as the scans *a*, *b* and *c* are concerned. On the other hand, if the V*g* signal terminates before the regenerated time signal occurs, it can be seen that trigger 181 will be turned on by the termination of the V*g* signal and will then be subsequently turned off when the regenerated signal appears on line 177. Such a condition indicates a relatively positive slope of the upper contour of the character.

A combined interlocking and resetting circuit is provided by the OR circuits 183 and 185, and inverters 178 and 189. When trigger 179 is turned on, its output is supplied through OR circuit 183, and is inverted by inverter 187 and supplied to trigger 181 in such manner as to hold this trigger off during the time the trigger 179 is on. Similarly, the output of trigger 181, when this trigger is on, is supplied through OR circuit 185 and inverter 189 to the off side of trigger 179 so the trigger 179 is held off when trigger 181 is turned on. Both triggers are set initially to the off condition by each T2 pulse, which pulse is supplied to a second input of both of the OR circuits 183 and 185. The circuit components are selected and arranged so that the end of the V*g* signal, for example, which turns trigger 179 off, cannot turn trigger 181 on because of the interlock signal supplied through OR circuit 183 and inverter 187, these circuits being D.C. coupled to the triggers, whereas the input signals are supplied through the usual A.C. coupling circuits.

It can be seen from the foregoing that the triggers 179 and 181 are respectively turned on by negative or positive slope conditions, and the duration of their on time is determined by the difference in the time intervals between the start of their present scan and the second previous scan, so that the time duration of the on condition of each of the triggers determines the degree of difference in the timing interval.

It can be seen from the foregoing that the outputs of the triggers 179 and 181 will be positive-going signals, the presence of which indicates a negative or a positive slope, respectively, and the duration of which indicates the degree or amount of slope. These signals are supplied to the inputs of a set of storage triggers 191 and 193, so that when each of the outputs from triggers 179 or 181 is terminated, the associated trigger 191 or 193 as may be the case is turned on. These latter triggers serve as intermediate storage devices which store the sense of the slope for subsequent combination with the relative steepness of slope, to provide suitable output circuits at read out time. The triggers are reset at the end of each scan by the negative-going or trailing edge of the T2 signals.

The variable duration output signals from triggers 179 and 181 are also supplied through an OR circuit 195 and inverter 197 to the grid of a triode 199 via a resistor 201 and capacitor 203 connected in multiple, so that the grid of tube 199 is driven to cut off for the duration of the signals supplied from the outputs of triggers 179 or 181. With tube 199 normally conducting, the voltage across a variable capacitor 205 will be determined by the drop across the resistor 207 connected between the plate of tube 199 and the positive potential terminal +250. When tube 199 is cut off during the output of the triggers 179 or 181, the potential across capacitor 205 will increase at a substantially linear rate, and is supplied through a cathode follower 209 to a pair of voltage discriminator or comparison circuits indicated generally by the reference characters 211 and 213. Since the structure of both voltage discriminator circuits 211 and 213 are identical, only that indicated by the reference character 211 will be described in detail, it being understood that the details of the other voltage discriminator circuit will be the same. The circuit includes a sharp cut off triode 215, the grid of which is supplied with the signals from cathode follower 209 via a capacitor 217 and resistor 219 connected in series, with the grid being biased to a suitable negative value by voltage supplied from an adjustable voltage divider 221 which is connected between the negative source terminal —100 and ground. The biasing voltage is supplied to the grid of tube 215 by way of a resistor 223 and a diode 225, which diode serves to speed the recovery of the circuit upon the cut off of the sawtooth voltage supplied from cathode follower 209. The filter capacitor 227 serves to stabilize the bias voltage. The plate of triode 215 is connected to positive source terminal +250 by way of a resistor 229, and the anode voltage is clamped to a +200 volt value by the diode 231, so that the output of tube 215 can go no further negative than 200 volts nor further positive than 250 volts, so that a 50 volt swing on the output signal is obtained. In operation, the tube 215 is normally nonconducting, so that its output stands at a relatively high voltage, for example, 250 volts, and when the incoming sawtooth voltage rises above a predetermined potential, as determined by the setting of the adjustable voltage divider 221, the tube 215 will rapidly go into conduction, whereupon the plate or ouptput voltage is sharply decreased to a value not less than 200 volts as determined by the clamp diode 231. It can thus be seen that the output of this circuit is a negative-going pulse, which occurs if and only if the sawtooth voltage supplied from cathode follower 209 persists for such a time as to allow the input signal to the voltage discriminator circuit 211 to rise above a predetermined value.

Accordingly, it will be seen that an output signal will be supplied from the voltage discriminator 211 when and only when the duration of the output from the negative slope trigger 179 or the positive slope trigger 181 exists for more than a predetermined time interval, indicating that the difference in time intervals is greater than some predetermined value.

The voltage discriminator circuit 213 operates in a similar manner except that its threshold value, as determined by the setting of the adjustable voltage divider, is set to a higher value than that of the voltage discriminator circuit 211, so that a negative-going output pulse is supplied from the voltage discriminator circuit 213 when and only when the output duration of the signals from the negative and positive slope triggers exists for more than a second predetermined time interval, greater than that determined by voltage discriminator circuit 211.

The outputs from voltage discriminator circuits 211 and 213 are supplied to the inputs of a pair of storage triggers 233 and 235 which triggers are turned on by the supply thereto of signals from the circuits 211 and 213 respectively, and which are both turned off by the T2 pulse occurring at the end of a scan. Therefore, trigger 233 when turned on represents a duration of time difference between the previous scan and the present scan time of intercepts or vice versa, which is greater than a first predetermined time limit, and the output of trigger 235 when turned on represents a time duration of greater extent than that provided by trigger 233.

The outputs of the slope sense triggers 191 and 193, and the outputs of the time duration triggers 233 and 235, are combined in a plurality of AND circuits to indicate varying conditions of slope sense and duration.

These AND circuits, indicated respectively by the reference characters 237, 239, 241, 243 and 245, indicate five various conditions of sense and duration or degree of slope which are of interest. Each of these circuits is supplied with one input from terminal T1 so that the outputs from the AND circuits are effective only at T1 time at the end of a given scan. The output of AND circuit 237 is supplied to a terminal GPS which designates a gentle positive slope, and the inputs to the AND circuit 237, in addition to the sample pulse T1, include the on output of trigger 233, indicating that the time differential is greater than the first predetermined amount, the output from trigger 193 which indicates a positive slope, and an output from the off side of trigger 235 which indicates that the time duration does not exceed the second predetermined value. Accordingly, at T1 time an output from AND circuit 237 will indicate a positive slope of the character contour which is at least as great as a first amount and less than a second predetermined amount. The second AND circuit 239 has its output connected to the terminal designated GNS, indicating a gentle negative slope, and the inputs to AND circuit 239 in addition to the sample pulse T1 include the on output of trigger 233, the on output of trigger 191, and the off output of trigger 235, this combination indicating a negative slope with a value falling within the first set of limits, so that a negative slope of at least a particular degree is indicated by an output from this circuit at sample time. The output of AND circuit 241 is supplied to a terminal SPS, designating a steep positive slope, and in addition to the sample pulse T1, requires an input from the positive slope storage trigger 193 and the long duration time trigger 235 which, in combination, indicate a steep positive slope of the character contour. AND circuit 243 has its output connected to a terminal SNS, designating a steep negative slope and, in addition to the sample input T1, includes an input from the negative slope trigger 191 and the trigger 235 so that the output from this AND circuit indicates a steep negative slope to the upper contour of the character. In the event that there is insufficient slope of the upper contour of the character in either direction or of insufficient duration, an output is provided from AND circuit 245 to a terminal 0S designating zero slope, which AND circuit has as its input the sample pulse T1, the off output of trigger 233, and the off output of trigger 235.

It will be apparent to those skilled in the art that still other combinations of outputs may be made available by suitable combinations of the outputs of the various storage triggers. Also, it is possible to provide either more or less than two voltage discriminator circuits, so that a finer discrimination in the degree of slope of a character contour can be obtained.

It will be understood that the various output signals described previously may be used in combination with still other signals derived from the scanning information to provide an indication of the character sensed, but these additional circuits form no part of the present invention and hence are not described herein. Moreover, the invention has been described as being utilized in connection with a character recognition system, but it is apparent that its usefulness may be extended to any situation in which it is desired to determine the difference in duration of signals occurring during successive cycles of operation and to provide an output indicating both the sense and duration of the time differences in such signals.

While the invention has been particularly shown and described with reference to a preferred embodiment thereof, it will be understood by those skilled in the art that the foregoing and other changes in form and details may be made therein without departing from the spirit and scope of the invention.

What is claimed is:

1. Apparatus for determining the sequence and time separation of similar events occurring during successive cycles comprising, in combination, time interval signal generating means effective during each of cycle for generating a time interval signal having a duration directly proportional to the time difference between a constant reference time for each cycle and the occurrence of the particular event during the cycle, a plurality of time analog voltage generators, switching means connected to said time interval generating means and said time analog voltage generators for switching time interval signals from a plurality of cycles to a corresponding time analog voltage generator, each said time analog voltage generator providing a time analog voltage having a magnitude proportional to the duration of the time interval signal supplied thereto, a plurality of storage means, one associated with each of said time analog voltage generators, for storing the time analog voltages generated during successive cycles, time regeneration means effective to provide a regenerated timing interval pulse therefrom at a time interval with respect to said reference time proportional to the magnitude of an input voltage supplied to the input of the time regeneration means, switching means for successively connecting each of said storage means to the input of said time regeneration means, and means for comparing the output signals from said time regeneration means and said time interval signal generating means.

2. Apparatus for determining the sequence and time separation of similar events occurring during successive cycles comprising, in combination, time interval signal generating means effective during each cycle for generating a time interval signal having a duration directly proportional to the time difference between a constant reference time for each cycle and the occurrence of the particular event during the cycle, a plurality of time analog voltage generators, switching means connected to said time interval signal generating means and said time analog voltage generators for switching time interval signals from a plurality of cycles to a corresponding time analog voltage generator, each said time analog voltage generator providing a time analog voltage having a magnitude proportional to the duration of the time interval signal supplied thereto, a plurality of storage means, one associated with each of said time analog voltage generators, for storing the time analog voltages generated during successive cycles, time regeneration means effective to provide a regenerated timing interval pulse therefrom at a time interval with respect to said reference time proportional to the magnitude of an input voltage supplied to the input of the time regeneration means, switching means for successively connecting each of said storage means to the input of said time regeneration means, and means for determining the sequence of occurrence of the signals from said time regeneration means and said time interval signal generating means.

3. Apparatus for determining the sequence and time separation of similar events occurring during successive cycles comprising, in combination, time interval signal generating means effective during each cycle for generating a time interval signal having a duration directly proportional to the time difference between a constant reference time for each cycle and the occurrence of the particular event during the cycle, a plurality of time analog voltage generators, switching means connected to said time interval signal generating means and said time analog voltage generators for switching time interval signals from a plurality of cycles to a corresponding time analog voltage generator, each said time analog voltage generator providing a time analog voltage having a magnitude proportional to the duration of the time interval signal supplied thereto, a plurality of storage means, one associated with each of said time analog voltage generators, for storing the time analog voltages generated during successive cycles, time regeneration means effective to provide a regenerated timing interval pulse therefrom, at a time interval with respect to said reference time proportional to the magnitude of an input voltage supplied to the input of the time regeneration means, switching means for successively connecting each of said storage means to the input of said time regeneration means, and means for determining the difference in time of occurrence of the output signals from said time regeneration means and said time interval signal generating means.

4. In apparatus for determining the sequence and time separation of similar events occurring during successive cycles, the combination comprising time interval signal generating means effective during each cycle for generating a time interval signal having a duration directly proportional to the time difference between a constant reference time for each cycle and the occurrence of the particular event during the cycle, a plurality of analog voltage generators each adapted to generate a time analog voltage proportional to the duration of input signals supplied to the generator input, a corresponding plurality of storage capacitors each adapted to be charged under control of the associated analog voltage generator to thereby provide a stored time analog voltage, a plurality of discharging circuits, one for each of said storage capacitors, each effective when supplied with an input signal to discharge the associated storage capacitor, sequential switching means effective to sequentially supply said time interval signals to said analog voltage generators during successive cycles, and to control said discharging circuits to discharge said capacitors during a cycle following the storage cycle, an output analog voltage line, means for sequentially connecting said output analog voltage line to said storage capacitors during at least a portion of the interval between the charging and discharging cycles for each capacitor, and means for comparing the outputs of said time interval signal generating means and said output analog voltage line.

5. In apparatus for determining the sequence and time separation of similar events occurring during successive cycles, the combination comprising time interval signal generating means effective during each cycle for generating a time interval signal having a duration directly proportional to the time difference between a constant reference time for each cycle and the occurrence of the particular event during the cycle, a plurality of analog voltage generators each adapted to generate a time analog voltage proportional to the duration of input signals supplied to the generator input, a corresponding plurality of storage capacitors each adapted to be charged under control of the associated analog voltage generator to thereby provide a stored time analog voltage, a plurality of discharging circuits, one for each of said storage capacitors, each effective when supplied with an input signal to discharge the associated storage capacitor, sequential switching means effective to sequentially supply said time interval signals to said analog voltage generators during successive cycles, and to control said discharging circuits to discharge said capacitors during a cycle following the storage cycle, an output analog voltage line, means for sequentially connecting said output analog voltage line to said storage capacitors during at least a portion of the interval between the charging and discharging cycles for each capacitor, and means for comparing the outputs of said time interval signal generating means and said output analog voltage line, said last named means comprising a time regenerating means effective to provide a regenerated time pulse occurring at a time interval following said constant reference time proportional to the magnitude of the signal on said output analog voltage time, and time comparing means for determining the sequence and difference in time of occurrence of said regenerated time pulse and the time interval signal in the present cycle.

6. Apparatus as claimed in claim 5, in which said time comparing means comprises a first and a second bistable device, said first bistable device being set to a first state by said regenerated time pulse and being set to a second state by the termination of the time interval signal for the present cycle, said second bistable device being set to a first state by the termination of the time interval signal for the present cycle and being set to a second state by said regenerated time pulse.

7. Apparatus as claimed in claim 6, in which said bistable devices are interlocked by supplying an output signal from each when in said first state to an input of the other device effective to establish and maintain the other device in its second state.

8. Apparatus as claimed in claim 7, in which time measuring means is connected to said bistable devices for determining the duration of the interval in which either of said bistable devices is set in its first state.

9. Apparatus as claimed in claim 8, in which said time measuring means comprises an analog voltage generator having its input connected to said bistable devices to thereby generate an analog voltage the amplitude of which is proportional to the duration of time in which either of said bistable devices is set to its first state, voltage discriminator means connected to said sawtooth voltage generator and effective to provide a first output signal when the analog voltage is less than a predetermined value and to provide a second output signal when the analog voltage is greater than a predetermined value.

10. Apparatus as claimed in claim 9, further comprising a plurality of output logic circuits effective to provide output signals when and only when predetermined combinations of signals are supplied thereto from said bistable devices and said voltage discriminator means.

No references cited.